May 11, 1937.  R. TRAUT  2,079,974
SAWING APPARATUS
Filed Nov. 22, 1933
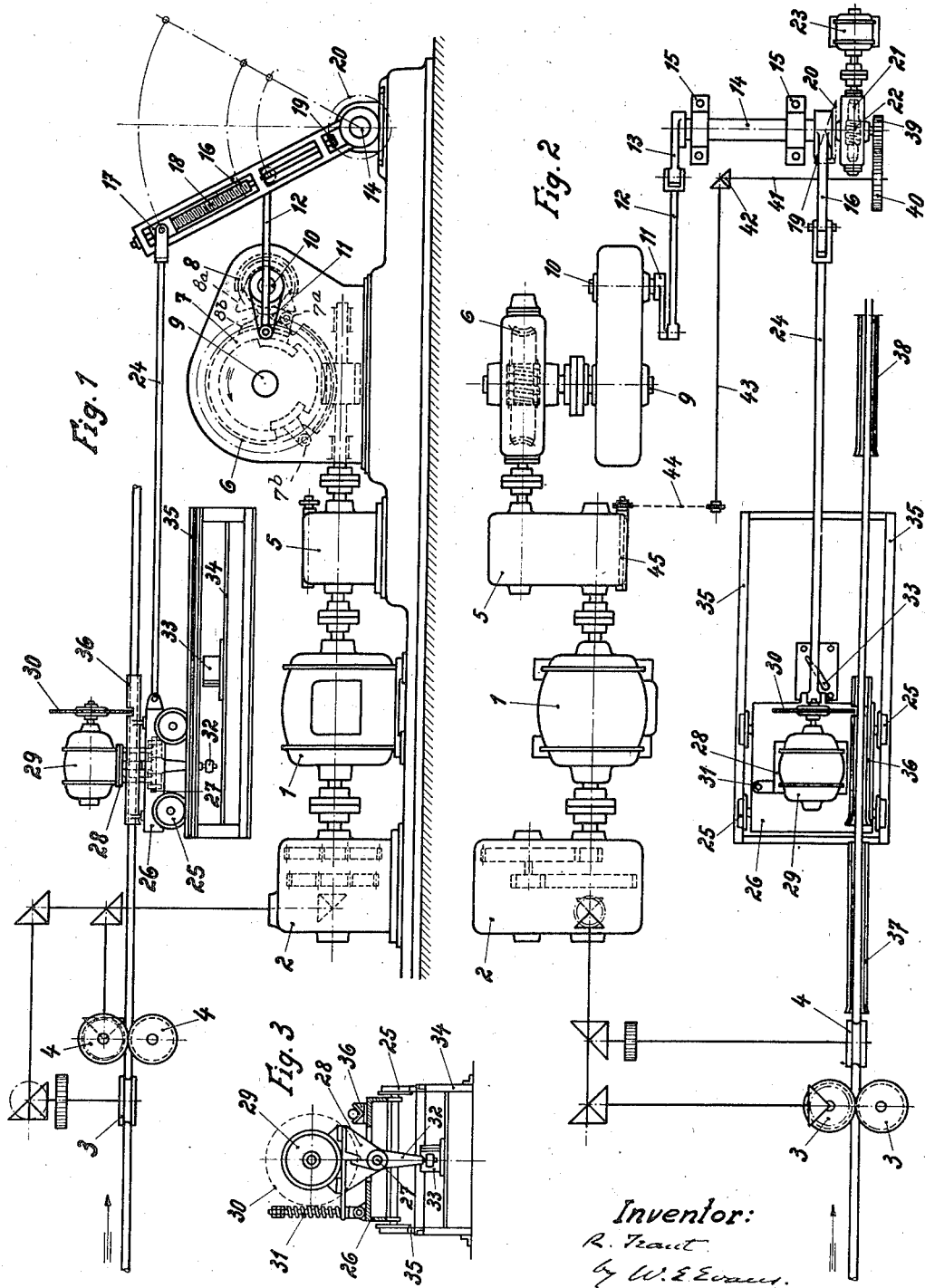
Inventor:
R. Traut
by W. E. Evans.
Attorney.

Patented May 11, 1937

2,079,974

UNITED STATES PATENT OFFICE 2,079,974

SAWING APPARATUS

Rudolf Traut, Mulheim-Ruhr, Germany

Application November 22, 1933, Serial No. 699,146
In Germany December 24, 1932

5 Claims. (Cl. 29—69)

It is known to cut into equal lengths welded tubes which have been produced from long welded strips and which leave the welding machine or welding rolling mill in an endless strip by a reciprocating cutting apparatus disposed to the rear of the rolling mill. For securing uniformity in the length of the sections of tube cut off, the tube as it comes from the rolling mill strikes against a stop disposed a predetermined distance from the rolling mill, this stop being employed for actuating the mechanism producing the reciprocation of the cutting apparatus. It has been found that this apparatus works perfectly in cutting tubes of the same length if the tube leaves the rolling mill at a relatively slow speed, such for example as three to five metres per minute. In rolling mills, which operate at higher speeds, however, for example, at from sixty to eighty metres per minute, it has been found that the stop-operated cutting machine produces tubes of varying lengths. The causes of this are that with the stop-switches and the electrical and mechanical devices connected thereto the switching operations are not effected in the same time, and that even small differences such as may produce an undesirable difference in lengths of tubes cut off may occur such, for example, as are caused by fluctuations in the voltage of the electric current or change in the co-efficients of friction of the brakes employed, in the case of the relatively high speed of delivery. Furthermore, with the apparatus hitherto employed, in which the moving mechanism of the cutting machine is actuated by a special driving gear it is difficult to ensure that the speed of the cutting machine shall correspond to the speed at which the tube leaves the rolling mill which again is absolutely essential in rolling mills which eject the tube at high speed.

To avoid these disadvantages it is proposed according to the invention to drive the movement producing mechanism of the cutting machine from the driving motor of the rolling mill and so to construct this mechanism that the cutting operation always takes place according to a definite speed of the rolling mill.

The apparatus according to the invention is illustrated, by way of example, in the accompanying drawing.

Figure 1 is an elevation of the apparatus.

Figure 2 is a corresponding plan.

Figure 3 is a section through the cutting mechanism, which may be, for example, a saw.

Referring to the drawing, the motor 1 drives through toothed gearing 2, the horizontally and vertically disposed rolls 3 and 4 respectively of the rolling mill. The driving motor 1 is also coupled to the driving gear 5 whose transmission ratio can be changed. This driving gear 5 drives through worm wheel 6 a pinion drive which consists essentially of the wheel 7 and the pinion 8. The wheel 7 is toothed over a small part of its periphery, and similarly the pinion 8 is toothed only on a certain part of its periphery. The toothed peripheries of the two wheels are the same in length. Directly adjacent to the pinion 8 there is firmly keyed on to the spindle 10 a conveyor disc 8a. This conveyor disc is provided with a shoe 8b, which disposes itself against the untoothed smooth crown of the wheel 7. So long as this disposition holds the conveyor disc and therefore also the pinion 8 and the spindle 10 cannot rotate, while the wheel 7 remains in continuous rotation, driven by the continuously rotating spindle 9. The wheel 7 is also provided with arms 7a and 7b, which have at their ends rollers which can engage in the cutaway parts of the conveyor disc 8. If the wheel 7 is, when the gearing is in the position indicated in the drawing, rotated in the direction indicated by the arrow, the conveyor roller on the arm 7a first enters the lower recessed part of the conveyor disc 8a, and causes the conveyor disc to rotate, rotation continuing until the two toothed crowns of the wheel 7 and the pinion 8 come into engagement. Thereupon the spindle 10 is rotated further by the inter-engagement of the toothed wheels 7 and 8, until the spindle 10 has made approximately three-quarters of a rotation. The conveyor roller of the arm 7b then enters the other recess in the conveyor disc 8a, and returns the latter into the position indicated, whereupon the spindle 10—which by that time has made a complete rotation of 360°—comes to rest, while the spindle 9 with the wheel 7 continues to rotate, that is to say, until the lever arm 7a again reaches the position now shown in the drawing, and repeats the sequence of movements hereinbefore described as it is further rotated. The spindle 9 thus rotates continuously with the spindle 7, while the spindle 10 is rotated after a certain period through 360 degs. by the conveyor disc 8a, after which it remains stationary for a certain length of time. The spindle 9 of the wheel 7 is coupled to the worm wheel spindle of the worm wheel 6, while the spindle 10 of the pinion 8 has secured to it the crank 11 which rocks the spindle 14 by means of the connecting rod 12 and the lever 13. The lever 16 is secured to the end of the spindle 14 opposite to the end at which the lever 13 is secured; the spindle 14 is mounted in bearings 15. The upper part of the lever 16 is formed with a longitudinal slot in which moves the slide block 17. The slide block 17 may be moved by the screw-threaded spindle 18, carrying at its lower end the bevelled wheel 19, which engages with the bevel wheel 20 loosely mounted on the rocking spindle 14. The bevel wheel 20 is connected to a worm wheel 21, which is loosely mounted on the rocking spindle 14 and which is rotated by means of the worm 22 and the reversing motor 23. By this means it is possible for the slide block 17 to be moved by the motor 23 into any position of the connecting link of the lever 16. The connecting rod 24 is linked to the slide block 17 by means of a forked bracket and at the other end is connected to the sawing apparatus. The latter consists of the carriage 26, which runs on the four wheels 25 and carries the table 28 which is adapted to rock about the spindle 27 and on which is secured the saw-driving motor 29, the saw 30 being mounted on the extension of the motor shaft. The table 28 is held in the horizontal position by the spring 31 and can be tipped to one side by means of the lever 32, which is loosely mounted to rotate on the spindle 27, and contacts at one side with a projection on the table 28. The lever 32 is actuated during the forward movement of the saw carriage by the lower end of the lever 32 striking against the plate or cam 33 having the contacting surface inclined to the direction of travel of the saw carriage, which is secured to the frame 34 below the saw carriage; the rails 35 for the saw carriage wheels are provided on the upper part of the frame 34. On the saw carriage 26 is mounted the slide channel 36 through which the tube passes, the channels 37 and 38 being disposed in fixed position in the path of the tube. Closely adjacent the slide channels 38 is a roller train (not shown in the drawing) for carrying away the cut-off tubes. The worm wheel 21 has also connected to it the toothed wheel 39, which on the rotation of the worm wheel rotates the spindle 45 by means of the toothed wheel 40 through the spindle 41, the bevelled wheels 42, the spindle 43 and the chain gear 44, which causes the necessary change speed in the gearing.

The apparatus operates as follows:—

The tube leaving the last pair of rolls 4 of the rolling mill slides through the channels 37, 36 and 38 at a speed which, when the rolls are rotating at a particular speed, is determined by the working diameter of the rolls when the latter are rotating. The speed at which the tube is ejected is constant when the speed of rotation of the rolls or of the driving motor is constant. Similarly when the speed of rotation of the driving motor is constant, the speed of rotation of the pinion spindle 9 is also constant; while also the periodic repetition of the movement of rotation of the pinion spindle 10 and therefore also the periodic repetition of the sawing operation is similarly constant. Uniformity of length of the tubes to be cut off thus necessarily follows by reason of the cutting operation occurring at regular intervals where the speed of movement of the tube leaving the rolls is constant.

The saw carriage is caused to reciprocate from time to time by the levers secured to the rocking spindle 14 and the rods 12 and 24 linked thereto, by means of the pinion drive. When the saw carriage advances in the direction taken by the ejected tube, the lever 32 hits against the inclined plate or cam 33; this causes the saw table to tilt around the rocking spindle 27 towards the tube, and the blade of the saw cuts off the section of tube. As the saw carriage moves on in the direction taken by the tube the rocking lever 32 ceases to press against the inclined plate or cam 33, whereby the saw table is returned by the spring 31 to its original position. When the saw carriage has reached the extreme right-hand position, it immediately returns to its left-hand extreme position, the lever 32 striking against the plate or cam 33 but moving in the opposite direction to that previously taken, when it can swing freely without moving the saw-table 28.

The saw makes its cut at about the middle of the travel of the saw carriage, that is to say, at about the middle position of the lever 16.

The effective length of the operative arm of the lever 16 can be varied by shifting the slide block 17. The speed of rotation of the pinion drive 7 and 8 and the ratio between the arms 13 and 16 are so determined that at the middle position of the saw—that is to say, at the moment of cutting—the speed of the saw is at least equal to the speed at which the tube is ejected. This condition must always be fulfilled in order to ensure that the cutting of the tube is effectively carried out. If the length of the tube that is to be cut off is to be changed and, for example, a greater length of tube is to be cut off, the conversion ratio of the gearing 5 is changed by rotating the spindle 45 in such manner that the spindle 9 of the pinion gearing rotates more slowly. This increases the time taken by each set of movements of the saw, and as the conversion of the rolling mill drive and therefore also the ejecting speed of the section of tube remains unaltered, the sections of tube cut off are lengthened as the time taken by one round of operations of the saw increases. If on the other hand shorter tubes are to be cut the time taken by one round of operations of the saw is reduced by correspondingly increasing the speed of rotation of the spindle 9.

If when cutting one particular length of tube the speed of the pinion drive and the relative positions of the levers 13 and 16 are so arranged that at the moment of the cutting operation the speed of travel of the saw carriage is the same as the speed of movement of the tube, this uniformity of condition will no longer exist if when cutting a different length of tube only the speed of rotation of the pinion spindle 9 is altered. In order that when there is a change in the speed of rotation of the spindle 9 there should be no change in the speed of cutting in the middle position, a change is made in the operative length of the lever 16 simultaneously with the change in the speed of rotation of the spindle 9. Thus for example, if in order to cut a longer tube the speed of rotation of the spindle 9 is reduced, the speed of the saw carriage would be less at the moment of cutting than the speed of the tube.

In order to compensate for this reduction in speed the operative arm of the lever 16 is lengthened to correspond by moving the slide block 17 upwardly. In this way the complete movement of the saw carriage in one direction is at the same time increased and therefore the speed of movement of the carriage at the middle position is also correspondingly increased. The change of conversion ratio of the gearing 5 and the movement of the slide block 17 in the connecting link of the lever 16 are effected simultaneously from the motor 23 which causes the rotation of the spindle 18 through the worm gear 21, 22 and the pair of bevelled wheels 19, 20 and at the same time rotates the adjusting spindle 45 of the gearing 5 through the toothed wheels 39, 40 and the spindles 41 and 43. It is thus possible without interrupting the cutting operation to alter the length of the tube cut within predetermined limits.

I claim:

1. Apparatus for cutting into sections of equal length tubes produced by apparatus such as a rolling mill, comprising a bed extending parallel to the direction of travel of the tube, a carriage adapted for reciprocation upon the said bed, a saw, and means for operating the said saw mounted for movement upon the said carriage in a direction transverse to the direction of travel of the tube, means positioned in the length of the bed for effecting an oscillatory movement of the saw, means for reciprocating the carriage upon the bed, a change speed gear operatively coupled to the drive of the rolling mill, and variable transmission gear between the said change gear and the means for reciprocating the carriage, said transmission gear including an element that is operated intermittently to transmit an intermittent movement to the means for reciprocating the carriage, the change gear effecting a change in the speed imparted to the transmission gear and the transmission gear varying the travel of the carriage in accordance with the change in length of the sections of tube to be severed and in dependence one on the other.

2. Apparatus for cutting into sections of equal length tubes produced by apparatus such as a rolling mill, comprising a bed extending parallel to the direction of travel of the tube, a carriage adapted for reciprocation upon the said bed, a saw, and means for operating the said saw mounted for movement upon the said carriage in a direction transverse to the direction of travel of the tube, means positioned in the length of the bed for effecting an oscillatory movement of the saw, a change speed gear operatively coupled to the driving gear of the rolling mill, a pinion gearing receiving movement from the change speed gear, said pinion gearing having elements formed so that the driving pinion is continuously rotated and the driven pinion intermittently rotated, a crank shaft mechanism operated by said pinion gear, and a rocking element coupled to said crank mechanism, said rocking element being linked to the said carriage and imparting a variable travel to the said carriage, the change gear effecting a change in the speed of oscillation imparted to the rocking element and the latter being adjusted to vary the travel of the carriage in accordance with the length of the sections of the tube to be severed and in dependence one on the other.

3. Apparatus for cutting into sections of equal length tubes produced by apparatus such as a rolling mill, comprising a bed extending parallel to the direction of travel of the tube, a carriage adapted for reciprocation upon the said bed, a saw, and means for operating the said saw mounted for movement upon the said carriage in a direction transverse to the direction of travel of the tube, means positioned in the length of the bed for effecting an oscillatory movement of the saw, a change speed gear operatively coupled to the driving gear of the rolling mill, a pinion gearing receiving movement from the change speed gear, said pinion gearing having elements formed so that the driving pinion is continuously rotated and the driven pinion intermittently rotated, a crank shaft mechanism operated by said pinion gearing, and a rocking element coupled to said crank mechanism, said rocking element being linked to the said carriage, the change gear effecting a change in the speed of oscillation imparted to the rocking element in accordance with the length of the sections of the tube to be severed, and the connection between the rocking element and the carriage being adjustable in the radial direction of the rocking element for variation of the travel of the carriage and of its speed of movement.

4. Apparatus according to claim 3, comprising a motor, gearing driven by said motor, adjusting means connecting said gearing with said change gear for variation of the gear ratio, and adjusting means connecting with said gear and effecting the adjustment of the connection between the rocking element and the carriage in a direction to or from the pivotal axis of the said element.

5. Apparatus according to claim 3, comprising a motor, adjusting means for adjusting the change gear for variation of the gear ratio, a rotatable screwed spindle mounted on said rocking element and extending in a direction radially with reference to the axis of the said element, a slide block slidably carried by said rocking element and screw-threaded to engage the said screw-threaded spindle, said slide block being linked to the carriage and gearing connecting the said motor with the said adjusting means and with the said spindle for effecting the required adjustments.

RUDOLF TRAUT.